UNITED STATES PATENT OFFICE.

AUGUST SCHMIDT, OF NEW YORK, N. Y., ASSIGNOR TO HIMSELF AND CHAS. EDWD. SCHMIDT AND HERMAN SCHMIDT, OF SAME PLACE.

IMPROVEMENT IN MODE OF MAKING GAS FROM WOOD.

Specification forming part of Letters Patent No. 29,941, dated September 4, 1860.

*To all whom it may concern:*

Be it known that I, AUGUST SCHMIDT, of the city and State of New York, have invented, made, and applied to use a new and Improved Process for Making Illuminating-Gas from Wood and Vegetable Matters; and I do hereby declare that the following is a full, clear, and exact description of the nature of my said invention.

Illuminating-gas has heretofore been made from wood and vegetable matter in a retort; and for the purposes of my present invention any desired retort or apparatus may be used that will reheat and properly act on the gaseous products after they are evolved from said vegetable mattter. I, however, prefer and use the apparatus for which Letters Patent were granted to me September 27, 1859, and to which reference is hereby expressly made as rendering further description or drawing of an apparatus unnecessary.

In all the previously-known processes for making gas from wood the carbon was considerably in excess, and there was not sufficient hydrogen to form in burning a perfect combusion, for in all instances the carbureted hydrogen from wood has been very different from that of coal. It requires more hydrogen in order that the product of combustion may only be carbonic acid and water, and thus the light will be the most brilliant, and there will be no smoke. Again, in all retorts, after the gas has been driven off from the wood, a very large amount of charcoal is left.

The nature of my said invention consists in the process of making gas from wood by the introduction of steam into the retort among the incandescent charcoal immediately after the gas has ceased, or almost ceased, to pass off from the wood, whereby a combination is effected between the water and the carbon in consequence of the peculiar condition of the carbon, so that the gas resulting is of a character adapted to lighting purposes. For this purpose I lead a pipe from any suitable boiler and attach it with a cock to said retort.

The operation is as follows: The retort, being charged with the wood or vegetable matter, is heated in the usual way, and the gas passed therefrom through a purifier into the gasometer. So soon as the flow of gas ceases, or nearly so, the cock is opened in said pipe sufficient to allow the required amount of steam to pass into the said retort, when it will be found that the flow of gas recommences or increases, and will continue for a greater or less time, according to circumstances, and, passing off through a purifier into the same gasometer, combines and mixes with the first from the wood and forms a very superior illuminating-gas; and I am enabled to make at least twenty-five per cent. more gas from the same quantity of wood than by any process heretofore pursued. The first gas passing from the wood has an excess of carbon, while the gas evolved after steam is admitted is of the following nature: The charcoal and oxygen of the water form carbonic oxide and carbonic acid, and also carbureted hydrogen, and at the same time a large amount of free hydrogen. These gaseous products mixing with the gas previously evolved containing an excess of carbon reduces the contents of the gasometer to the proper relative proportions of carbon and hydrogen for forming the best illuminating-gas.

I do not claim manufacturing gas from wood, as that is well known; neither do I claim the introduction of steam into a retort containing charcoal, as that has before been used for making gas; but

What I claim, and desire to secure by Letters Patent, is—

The manufacture of illuminating-gas from wood by the successive processes herein set forth.

In witness whereof I have hereunto set my signature this 30th day of April, 1860.

AUGUST SCHMIDT.

Witnesses:
FR. M. RUSCHHAUPT,
LEMUEL W. SERRELL.